(12) United States Patent
Sano et al.

(10) Patent No.: US 8,052,031 B2
(45) Date of Patent: Nov. 8, 2011

(54) BONDING STRUCTURES FOR CONTAINERS AND METHOD OF BONDING SAME

(75) Inventors: Akihiko Sano, Tokyo (JP); Yoshitaka Miura, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 323 days.

(21) Appl. No.: 11/900,747

(22) Filed: Sep. 13, 2007

(65) Prior Publication Data

US 2008/0067216 A1 Mar. 20, 2008

(30) Foreign Application Priority Data

Sep. 14, 2006 (JP) .................................. 2006-249650

(51) Int. Cl.
*B23K 20/12* (2006.01)
(52) U.S. Cl. ...................................... 228/112.1; 228/2.1
(58) Field of Classification Search ................ 228/112.1
See application file for complete search history.

(56) References Cited

U.S. PATENT DOCUMENTS

| | | | |
|---|---|---|---|
| 6,676,008 B1 * | 1/2004 | Trapp et al. ................. | 228/112.1 |
| 2004/0144832 A1 * | 7/2004 | Nakamura et al. .......... | 228/112.1 |

FOREIGN PATENT DOCUMENTS

| | | |
|---|---|---|
| JP | 10-160097 | 6/1998 |
| JP | 2001-225179 | 8/2001 |
| JP | 2001-237621 A | 8/2001 |
| JP | 2002-224861 | 8/2002 |
| JP | 2004-160528 | 6/2004 |
| JP | 2004-293785 | 10/2004 |
| JP | 2004286105 | 10/2004 |
| JP | 2004286105 A * | 10/2004 |

OTHER PUBLICATIONS

Machine translation of JP 2004286105 which published Oct. 14, 2004.*

* cited by examiner

*Primary Examiner* — Jessica L Ward
*Assistant Examiner* — Nicholas D'Aniello
(74) *Attorney, Agent, or Firm* — Young Basile (57) ABSTRACT

A bonding structure for a container member is disclosed. The container member has an opening and a covering member for covering the opening. The container member and covering member are abutted with each other and bonded by a friction stir welding operation. The bonding structure for the container and covering members comprises a bonding portion and a backing member. The bonding portion of the container member and the covering member is formed by inserting a friction stir welding tool into an abutting portion of the container member and the covering member. The backing member is provided for obstructing a plastic flow of materials for the container member and the covering member when the friction stir welding operation is performed. The backing member is disposed adjacent to the bonding portion, at a side of the abutting portion that is opposite to an inserting side of the friction stir welding tool.

21 Claims, 8 Drawing Sheets

BONDING STRUCTURES FOR CONTAINERS AND METHOD OF BONDING SAME

CROSS REFERENCE TO RELATED APPLICATIONS

This application claims priority from Japanese Patent Application Serial Nos. 2006-249650 filed Sep. 14, 2006 and 2007-141767 filed May 29, 2007, the disclosures of which, including their specifications, drawings and claims, are incorporated herein by reference in their entirety.

TECHNICAL FIELD

The present disclosure relates to a bonding structure for containers and a method of bonding same.

BACKGROUND

An impeller shell and a converter cover of a conventional torque converter are typically assembled using an arc welding operation. However, when using such an operation, one problem that usually occurs is sputters that are generated during the operation. More specifically, the sputters may sneak through a gap of a fitting portion disposed between the impeller shell and the converter cover. Thus, the sputters may inadvertently penetrate into the torque converter and turn into metallic granular substances. As such, the metallic granular substances may become prevalent in the ATF (Automatic Transmission Fluid), thereby requiring a high-performance filter with a fine mesh to filter out same.

In one attempt to resolve the above problem, Japanese Laid-Open Patent Publication No. 2004-286105 discloses a method of assembling a torque converter using a friction stir welding operation. Specifically, the fitting portion of an impeller shell and a converter cover is faced toward a stir rod (tool) to implement the above operation, wherein the stir rod transitions along an axial direction of the torque converter. The stir rod is then inserted into the fitting portion to thereby bond them together without generating any sputters.

In the above method, the bonding portions of the impeller shell and the converter cover are formed in a planar shape. By doing so, the stress at the bonding portion caused by an inner pressure of the torque converter can be avoided. In this respect, a spacing portion for forming a planar surface is formed at a lower surface side of the bonding portion (see cavity 13 shown in FIG. 3 of Japanese Laid-Open Patent Publication No. 2004-286105).

However, when using the above method, a plastically flowing material may flow into the spacing portion during the friction stir welding operation. Further, a depression may occur at the bonding portion, thus deteriorating the overall bonding strength of the bonding portion.

SUMMARY

A bonding structure for a container member is disclosed. The container member has an opening and a covering member for covering the opening. The container member and covering member are abutted with each other and bonded by a friction stir welding operation. The bonding structure for the container and covering members comprises a bonding portion and a backing member. The bonding portion of the container member and the covering member is formed by inserting a friction stir welding tool into an abutting portion of the container member and the covering member. The backing member is provided for obstructing a plastic flow of materials for the container member and the covering member when the friction stir welding operation is performed. The backing member is disposed adjacent to the bonding portion, at a side of the abutting portion that is opposite to an inserting side of the friction stir welding tool. A method is also disclosed.

BRIEF DESCRIPTION OF THE DRAWINGS

The features of the present disclosure will become more apparent from the following description of the embodiments given in conjunction with the accompanying drawings.

DETAILED DESCRIPTION

While the claims are not limited to the illustrated embodiments, an appreciation of various aspects of the disclosure is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present disclosure are described in detail by referring to the drawings as follows.

Figure 1:
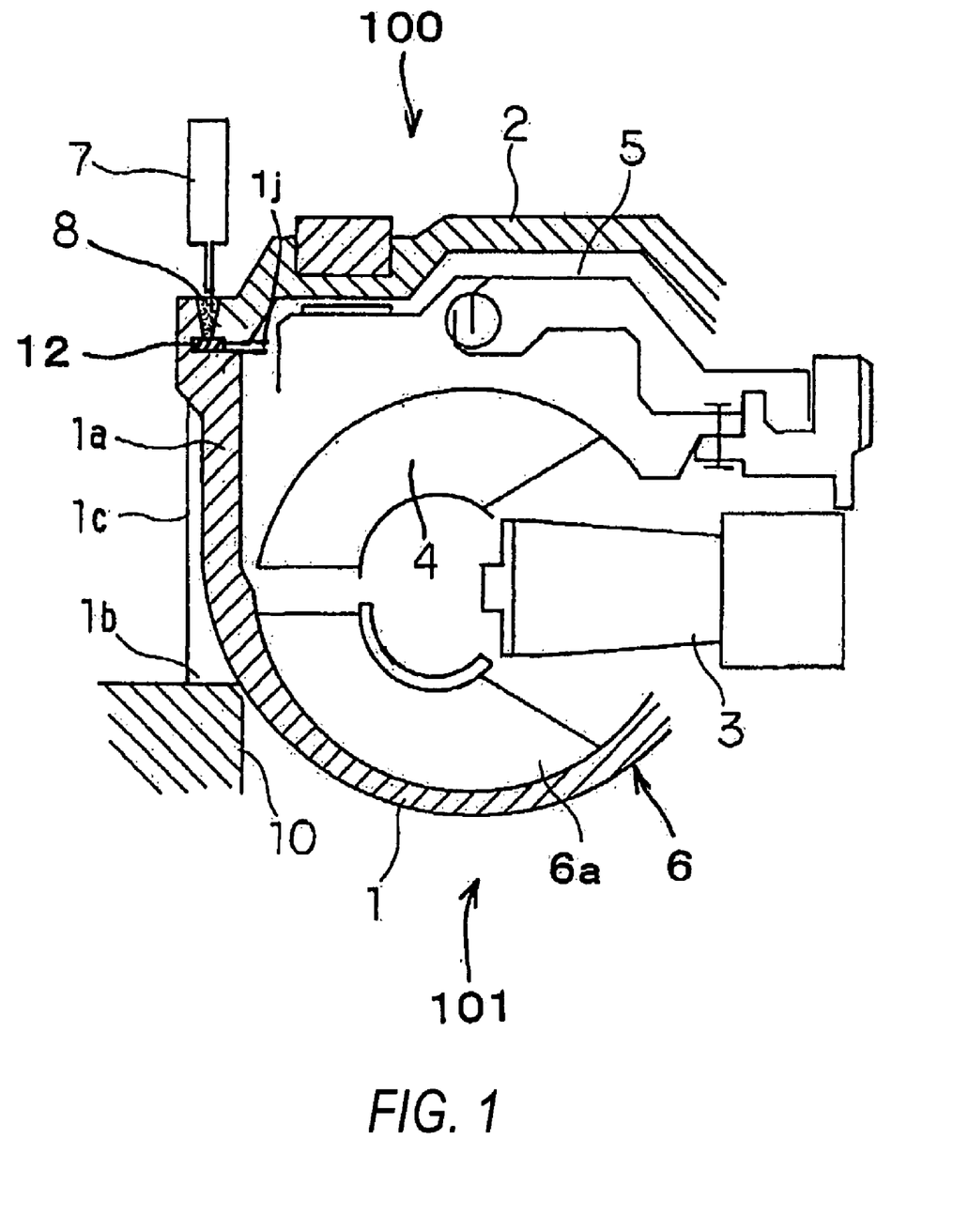
FIG. 1 is a partial sectional view illustrating a main portion of a torque converter.

FIG. 1 is a partial sectional view illustrating a main portion of a torque converter 100 constructed in accordance with a first embodiment of the present invention. As shown in FIG. 1, the torque converter 100 has a torque converter case 101 (a container). As described below, the torque converter case 101 is formed by abutting a converter cover 2 (a covering member) with an impeller shell 1 (a container member) and bonding an abutting surface using a friction stir welding (FSW) operation. In one embodiment, the converter cover 2 has a disk-like shape.

The torque converter case 101 supports a stator 3, a turbine runner 4, a lock-up clutch 5, etc. The impeller shell 1 has a curved cross-sectional shape, the end of which is opened to accommodate the turbine runner 4. By fitting the converter cover 2 covering an opening 1j into the opening end of the impeller shell 1, the impeller shell 1 and the converter cover 2 can be abutted with each other. By inserting a friction stir welding tool into the abutting portion of the impeller shell 1 and the converter cover 2, the impeller shell 1 and the converter cover 2 are friction stir welded using a bonding portion 8 formed at the abutting portion. A plurality of wings 6a is formed at an inner surface of the impeller shell 1. The wings 6a and the impeller shell 1 collectively comprise an impeller 6. Further, the impeller 6 and the turbine runner 4 are disposed opposite to each other.

A shoulder portion 1b is formed on an outer portion along a diametric direction of an outer surface, or outer periphery, 1a of the impeller shell 1. The shoulder portion 1b is subject to a load applied on the impeller shell 1 when the friction stir welding operation is performed. The shoulder portion 1b contacts a jig shown in FIG. 1 and is subjected to a pressure load from a stir rod (tool) 7 in the friction stir welding equipment. The shoulder portion 1b further supports the torque converter 100. A rib 1c may be formed between the shoulder portion 1b and the bonding portion 8 so as to ensure the axial strength and the rigidity of the impeller shell 1. Although the bonding portion 8 is formed over an entire periphery of the impeller shell 1 and the converter cover 2, the bonding portion 8 is preferably provided only at the major points of the shoulder portion 1b and the rib 1c. Aluminum alloy having a relatively low softening temperature is preferably used as a material for the impeller shell 1 and the converter cover 2. The softening temperature is a temperature wherein the material is softened by frictional heat during the friction stir welding operation. However, it will be appreciated that in addition to the aluminum alloy, other types of materials capable of being friction stir welded may be used to form the impeller shell 1 and the converter cover 2 (e.g., including, but not limited to, magnesium alloy, titanium, titanium alloy, copper, copper alloy, mild steel, etc.).

In the bonding structure for the torque converter case 101 of the present embodiment, an annular backing member 12 is provided as a bank member for obstructing the plastic flow of materials for the impeller shell 1 and the converter cover 2 during the friction stir welding operation. The backing member 12 is disposed along the bonding portion 8 at a side opposite to an inserting side of the stir rod 7. A material having a softening temperature higher than that of the material used for the impeller shell is used a material for the backing member. In one particular embodiment, an iron-based material having a softening temperature higher than that of an aluminum alloy is used as the material for the backing member. Further, the rotation speed and the pressing force (against a material to be bonded) of the stir rod 7 are set to predetermined values, wherein the frictional heat generated from friction with the impeller shell 1 and the converter cover 2 (materials to be bonded) does not exceed the softening temperature of the backing member 12. By doing so, the backing member 12 is not softened when the friction stir welding operation is performed. Accordingly, the plastic flow of the materials for the impeller shell 1 and the converter cover 2 can be effectively obstructed by the backing member 12.

First Embodiment

Figure 2A:
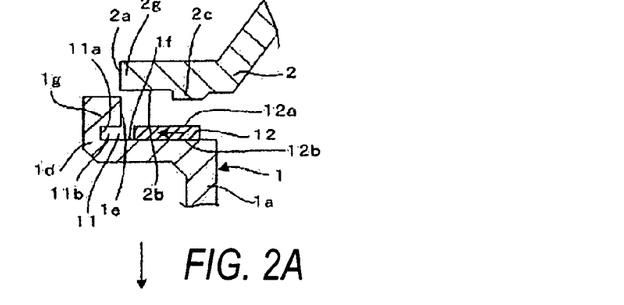
FIGS. 2A to 2D are partial sectional views illustrating a method of assembling a torque converter in accordance with a first embodiment of the present disclosure.
Figure 2B:
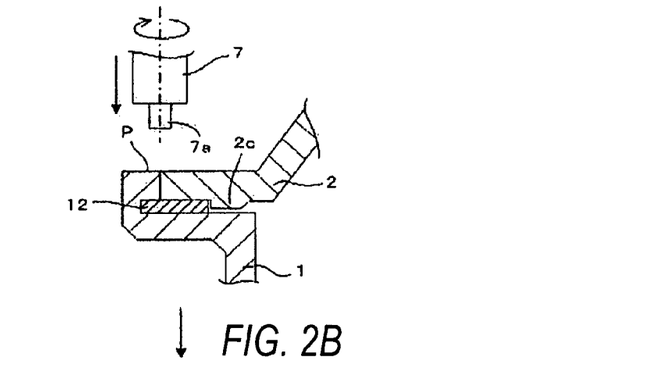
Figure 2C:
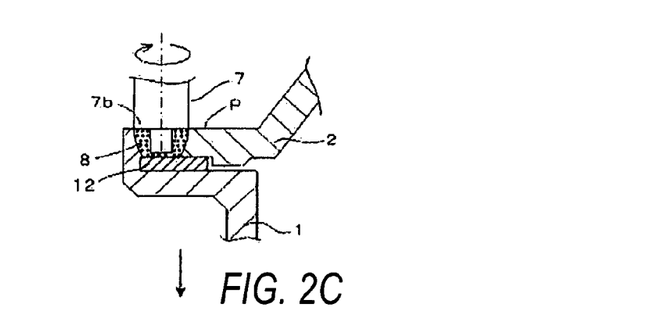
Figure 2D:
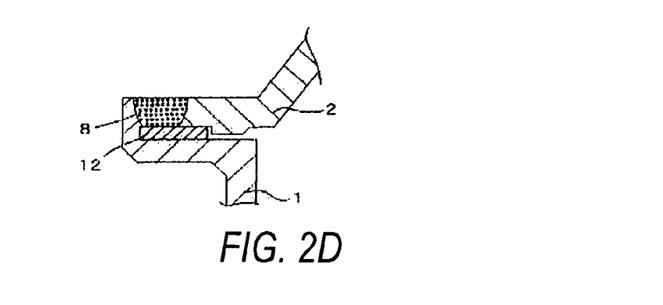

FIGS. 2A to 2D are partial sectional views illustrating a method of assembling the torque converter of a first embodiment. Specifically, FIG. 2A shows a process of fitting the converter cover 2 after installing the backing member 12 at the impeller shell 1. FIG. 2B shows a process of inserting a tool 7 into the impeller shell 1 and the converter cover 2. Further, FIG. 2C shows a process for the friction stir welding operation. FIG. 2D shows a state when the bonding operation is completed. Each stage will now be described in further detail.

As shown in FIG. 2A, a flange portion 1d is formed in the impeller shell 1. The flange portion 1d extends from an outer periphery 1a of the impeller shell 1 to an outside of a diametric direction. In the flange portion 1d, an annular abutting portion 1g, which is abutted to the converter case 2 during the friction stir welding operation, is extended toward an axial direction of the impeller shell 1. An inner peripheral surface of the abutting portion 1g is a generally cylindrical abutting portion 1e, which is coaxial with the rotation axis of the torque converter. On the other hand, an outer peripheral end in a diametric direction of the converter cover 2 is a flange-like abutting portion 2g, which is abutted to the abutting portion 1g of the impeller shell 1 during the friction stir welding operation. An outer surface in a diametric direction of the abutting portion 2g is a generally cylindrical abutting portion 2a formed coaxially with an axis of the torque converter 100. By fitting the converter cover 2 into an inner side of the abutting portion 1g of the impeller shell 1, the abutting surfaces 1e and 2a are abutted with each other in a diametric direction of the torque converter 100.

A generally annular groove 11b is formed in the flange portion 1d of the impeller shell 1. An outer side portion, which is in a diametric direction of the backing member 12, is inserted into the groove 11b. The groove 11b and a space, which is connected to the groove 11b between the impeller shell 1 and the converter cover 2, collectively constitute a spacing portion 11 for receiving the backing member 12. A bottom surface 11a of the groove 11b is disposed more at an outer periphery side than the abutting surfaces 1e and 2a in a diametric direction of the torque converter 100. The abutting surfaces 1e and 2a are placed on the backing member 12 when fitting the converter cover 2 into the impeller shell 1 while inserting the backing member 12 into the groove 11b.

The backing member 12 is divided into a plurality of parts so as to be insertable into the annular spacing portion 11. In one particular embodiment, the backing member 12 is divided into three or more parts. A surface of the backing member 12, which is at a side of the bonding portion 8 (see FIG. 2C), is configured to be a substantially flat surface 12a. The plastic flow of the materials for the impeller shell 1 and the converter cover 2 may be obstructed by the substantially flat surface 12a during the friction stir welding operation. A surface of the backing member 12 at an opposite side is configured to be a substantially flat surface 12b, which contacts and becomes supported by the impeller shell 1.

Further, an annular convex portion 2c, which extends in a direction generally parallel to the abutting surfaces 1e and 2a, is formed at a wall surface 2b of the converter cover 2. The wall surface 2b of the converter cover 2 is generally orthogonal to the abutting surfaces 1e and 2a and forms the spacing portion 11. The convex portion 2c inhibits the movement of the backing member 12 to an inner side in the diametric direction and prevents the backing member 12 from escaping the groove 11b.

A method of assembling the torque converter, which is constructed in accordance with the above, will now be explained with reference to FIGS. 2A to 2D.

First, in FIG. 2A, a divided backing member 12 is inserted into the groove 11b of the impeller shell 1. The converter cover 2 is then fitted into the impeller shell 1 from a rotational axis direction of the torque converter. The converter cover 2 is fitted into the impeller shell 1 to thereby effect the positioning of the backing member 12 by the convex portion 2c formed in the converter cover 2. Further, the abutting surfaces 1e and 2a are abutted with each other, wherein a tip end 7a of the stir rod 7 is pressed into the abutting surfaces 1e and 2a from the top.

In FIG. 2B, the stir rod 7 is pressed to the abutting portions 1g and 2g with a predetermined load while being rotated at a predetermined rotation speed. As such, the friction stir welding operation for bonding the abutting portions 1g and 2g is initiated. As shown in FIG. 1, the friction stir welding operation first loads the shoulder portion 1b of the impeller shell 1 (into which the converter cover 2 is fitted) on the jig 10 when the converter cover 2 is allowed to be an upper side. The friction stir welding operation is then performed by moving the stir rod 7 towards the abutting portions 1g and 2g from the top of the abutting portions 1g and 2g. A frictional heat is generated between the tip end 7a and the abutting portions 1g and 2g by contacting them together. The materials for the impeller shell 1 and the converter cover 2 are softened by frictional heat, for example. As shown in FIG. 2C, the tip end 7a of the stir rod 7 is pressed into the softened materials to a predetermined depth.

Next, when the stir rod 7 is inserted into the abutting portions 1g and 2g as shown in FIG. 2C, the materials for the softened impeller shell 1 and the converter cover 2 plastically flow along a periphery of the stir rod 7 due to a rotational force of the stir rod 7. The plastically flowing materials are then blended. When the stir rod 7 is moved along the abutting surfaces 1e and 2a while the stir rod 7 is inserted, a bonding portion 8 is formed at a rear portion of the moving direction, wherein the bonding portion 8 is a solid phase bonding area in which the materials are blended. The impeller shell 1 and the converter cover 2 are integrated by such a bonding portion 8. As shown in FIG. 2D, the bonding operation of the impeller shell 1 and the converter cover 2 is completed by moving the stir rod 7 over their entire periphery and drawing the stir rod 7 from the abutting portions 1g and 2g.

As shown in FIG. 2C, a depth of the friction stir welding operation is set by contacting the shoulder portion 7b of the stir rod 7 to an end face P of an outer side of the abutting portions 1g and 2g. A distance from a tip face of the tip end 7a to the shoulder portion 7b is set to be a bonding depth. The bonding depth is set such that the bonding portion 8, which is formed by the friction stir welding operation, reaches the backing member 12. Since the backing member 12 is disposed at a side opposite to the inserting side of the stir rod 7, the plastically flowing materials are obstructed by the generally flat surface 12a of the backing member 12 when the friction stir welding operation is performed. By doing so, when the bonding between the impeller shell 1 and the converter cover 2 is maintained as an abutting bonding, it is possible to prevent the flow of plastically flowing materials and the deterioration of bonding quality of the bonding portion 8. Further, since the plastic flow of the materials for the impeller shell 1 and the converter cover 2 is obstructed by the generally flat surface 12a of the backing member 12, a surface at a backing member 12 side in the bonding portion 8 becomes a generally flat surface that is adjacent to the backing member 12.

Figure 8A:
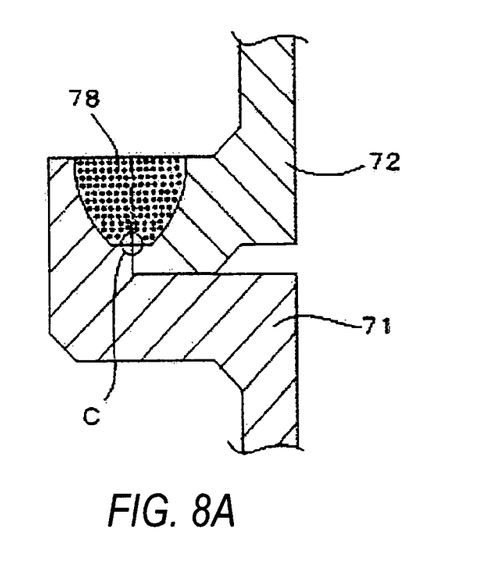
FIG. 8A is a partial sectional view of a first comparative example.
Figure 8B:
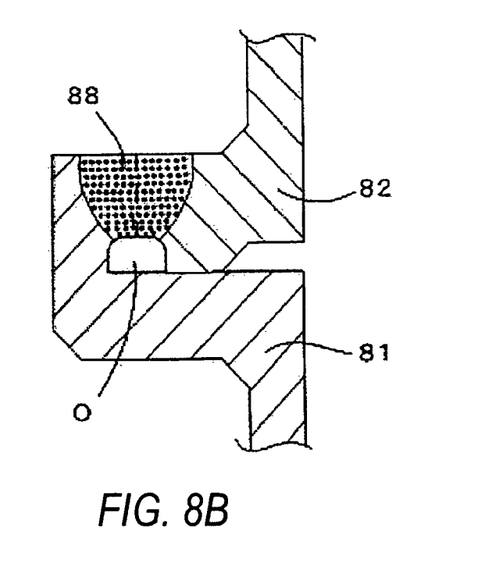
FIG. 8B is a partial sectional view of a second comparative example.
Figure 8C:
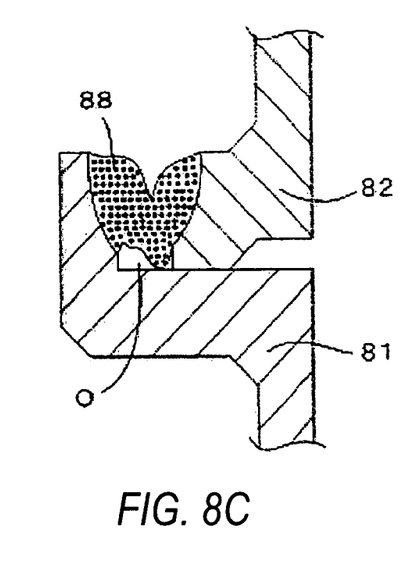
FIG. 8C is a partial sectional view illustrating a problem associated with the second comparative example.

FIGS. 8A-8C are each a partial sectional view illustrating a bonding state of the friction stir welding operation. Specifically, FIG. 8A is a partial sectional view illustrating a first comparative example, whereas FIG. 8B is a partial sectional view illustrating a second comparative example. Further, FIG. 8C is a partial sectional view illustrating a problem associated with the second comparative example.

In the first comparative example shown in FIG. 8A, a backing member is not used, unlike the first embodiment. Further, an impeller shell 71 and a converter cover 72 are bonded by a bonding portion 78. The bonding portion 78 is cut off when abutting the surface of the impeller shell 71 and the converter cover 72. In such a case, the cut-off portion becomes a stress concentration region C in the bonding portion 78 due to an application of pressure when using the torque converter.

On the contrary, since the plastic flow of the materials for the impeller shell 1 and the converter cover 2 is obstructed by the generally flat surface 12a of the backing member 12 in the first embodiment, the bonding portion 8 is not cut off when abutting the surfaces between the workpieces as in the first comparative example. Therefore, it is possible to eliminate the stress concentration region C in the bonding portion 78 due to an application of pressure within the case when using the torque converter. Further, as shown in FIG. 8B, a spacing portion O for forming a planar surface is formed at a lower side of a bonding portion 88 to avoid the stress concentration in the bonding portion 88 of an impeller shell 81 and a converter cover 82. In such a case, the plastically flowing materials are likely to flow in the spacing portion O, as shown in FIG. 8C. On the contrary, since a back surface side of the bonding portion 8 is blocked by the backing member 12 in the first embodiment, the flow of the materials shown in FIG. 8C can be effectively prevented.

Further, in the first embodiment, the generally flat surface 12b at a side opposite to the bonding portion 8 of the backing member 12 is supported by the impeller shell 1. To this end, even when the pressing force is applied to the abutting portions 1g and 2g by the stir rod 7, the abutting portions 1g and 2g are supported by the impeller shell 1 via the backing member 12. Therefore, even in a container such as the torque converter case 101, the impeller shell 1 is supported so as to effectively carry out the friction stir welding operation by using the backing member 12.

Further, in the first embodiment, the impeller shell 1 has the groove 11b into which the backing member 12 is inserted. Also, the converter cover 2 has the generally convex shaped portion 2c for inhibiting the backing member 12 from escaping the groove 11b. To this end, a displacement of the backing member 12 is effectively prevented by the groove 11b and the convex portion 2c when the friction stir welding operation is conducted. In addition, the plastic flow of the materials can be effectively prevented by the backing member 12.

Second Embodiment

FIGS. 3A to 3D are partial sectional views illustrating a method of assembling a torque converter in accordance with a second embodiment of the present disclosure. As described above, the convex portion 2c is formed in the converter cover 2 of the first embodiment. However, in the second embodiment, a convex portion 2d that is extended further than the convex portion 2c is formed instead of the convex portion 2c. A concave portion 13 (into which the tip end of the convex portion 2d is fitted) is formed in the impeller shell 1. Similar to the convex portion 2c of the first embodiment, the convex portion 2d regulates the position of the backing member 12. The height of the convex portion 2d is set to be at least slightly greater than the thickness of the backing member 12.

Figure 3A:
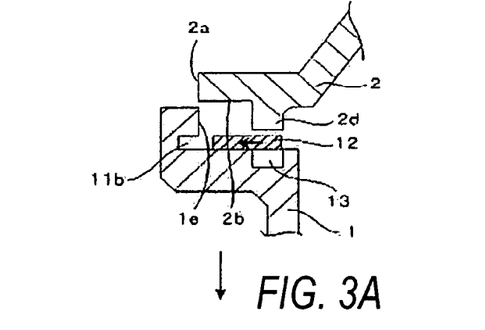
FIGS. 3A to 3D are partial sectional views illustrating a method of assembling a torque converter in accordance with a second embodiment of the present disclosure.
Figure 3B:
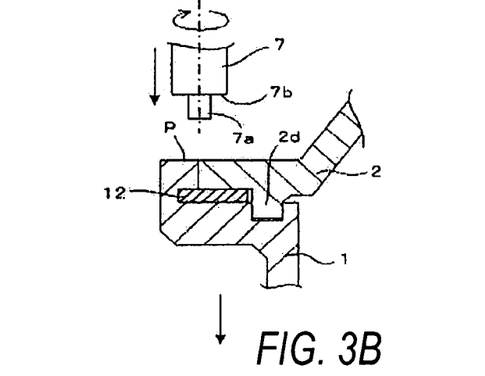

As shown in FIG. 3A, after inserting the divided backing member 12 into the groove 11b of the impeller shell 1, the converter cover 2 is fitted into the impeller shell 1 as in the first embodiment. At this time, as shown in FIG. 3B, the tip end of the convex portion 2d is fitted into the concave portion 13. By doing so, a spacing portion 11 for receiving the backing member 12 is formed from a space for receiving the turbine runner 4, etc., by the convex portion 2d.

Figure 3C:
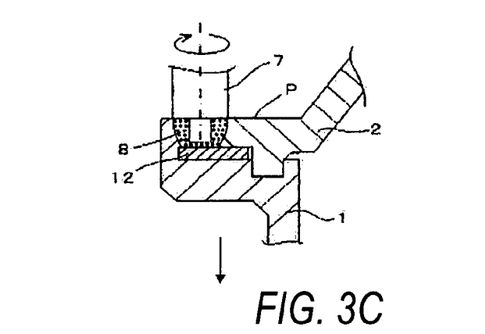
Figure 3D:
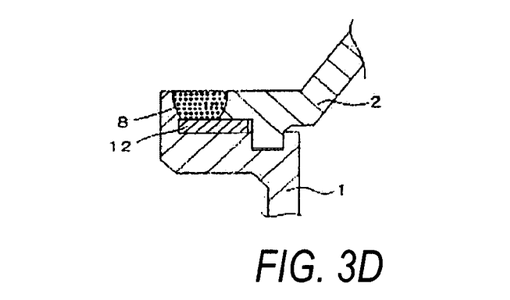

Thereafter, as shown in FIGS. 3B to 3D, the friction stir welding operation is performed as in the first preferred embodiment. Further, the bonding operation for the impeller shell 1 and the converter cover 2 is also performed.

In the second embodiment, the convex portion 2d and the concave portion 13 are formed to fit with each other when abutting the impeller shell 1 and the converter cover 2. Therefore, even when an inner pressure of the torque converter increases, it is possible to prevent the inner pressure from being applied to the bonding portion 8 due to the fit between the convex portion 2d and concave portion 13.

Third Embodiment

Figure 4:
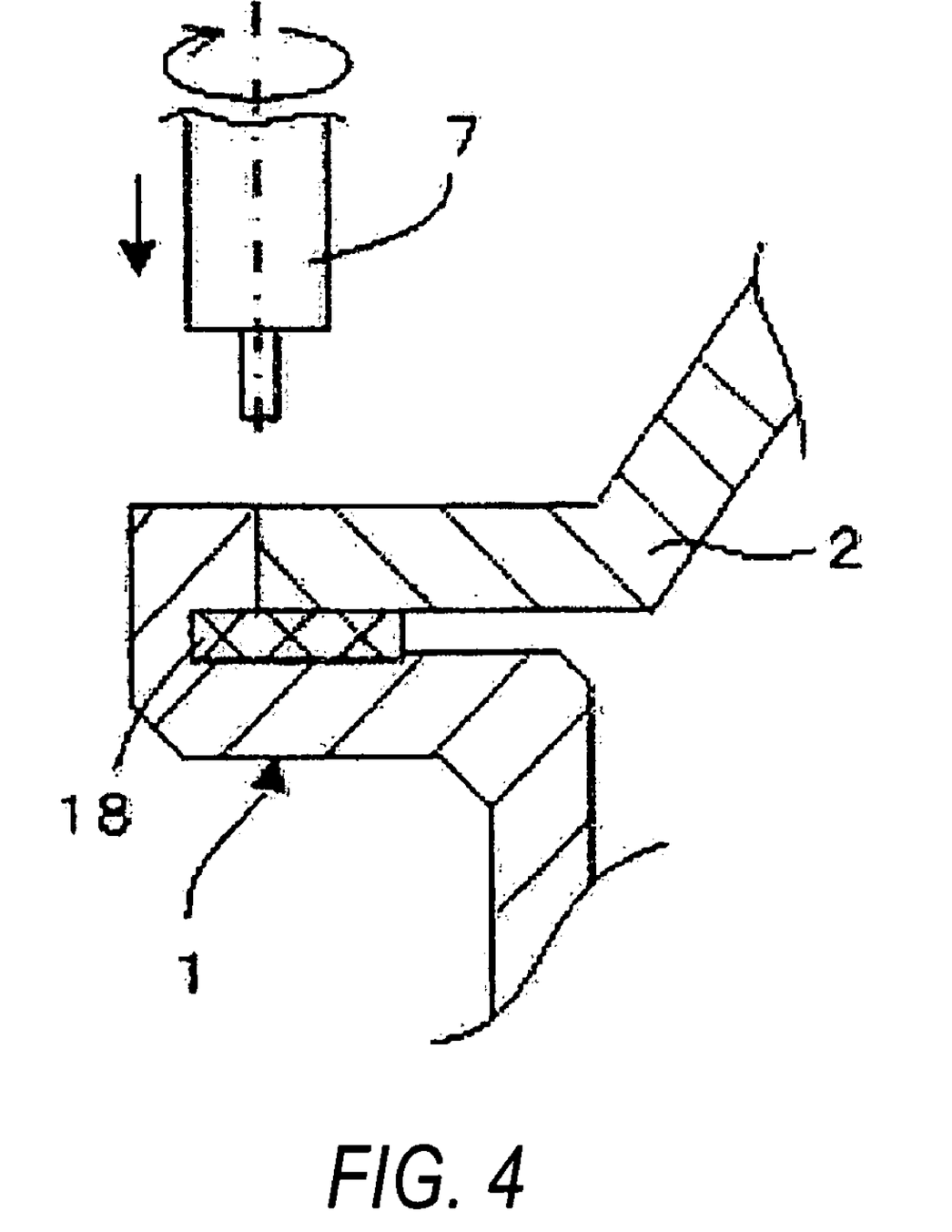
FIG. 4 is a partial sectional view illustrating a bonding structure for a torque converter case in accordance with a third embodiment of the present disclosure.

FIG. 4 is a partial sectional view illustrating a bonding structure for the torque converter case in accordance with a third embodiment of the present disclosure. This embodiment differs from the previous embodiments in terms of the construction of the torque converter. Specifically, the backing member 12 is formed as a separate member in the previous embodiments. However, in the third embodiment, the backing member 18 is integrally formed with the impeller shell 1 via a cast-in operation when casting the impeller shell 1. In this embodiment, the backing member 18 is made from an iron-based material, while the impeller shell 1 is formed by an aluminum casting operation.

The converter cover 2 is fit into the impeller shell 1 in which the backing member 12 is cast-in. Further, the impeller shell 1 and the converter cover 2 are bonded by the friction stir welding operation as in the previous preferred embodiments.

Fourth Embodiment

Figure 5A:
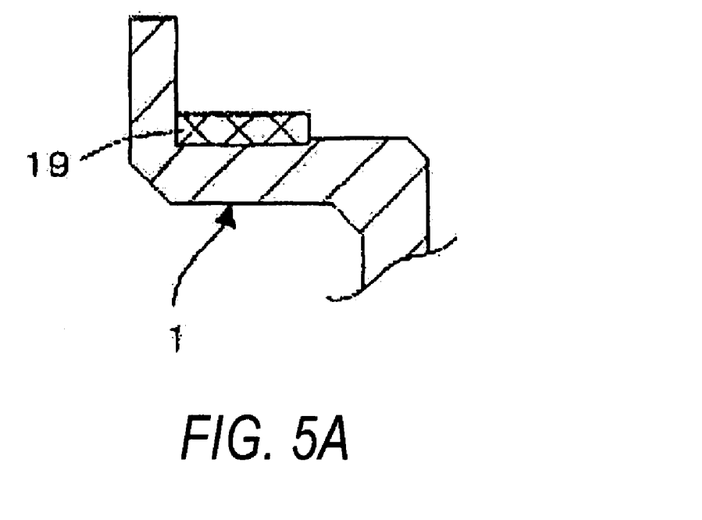
FIG. 5A is a partial sectional view illustrating a process of fixing a backing member to an impeller shell in accordance with a fourth embodiment of the present disclosure.
Figure 5B:
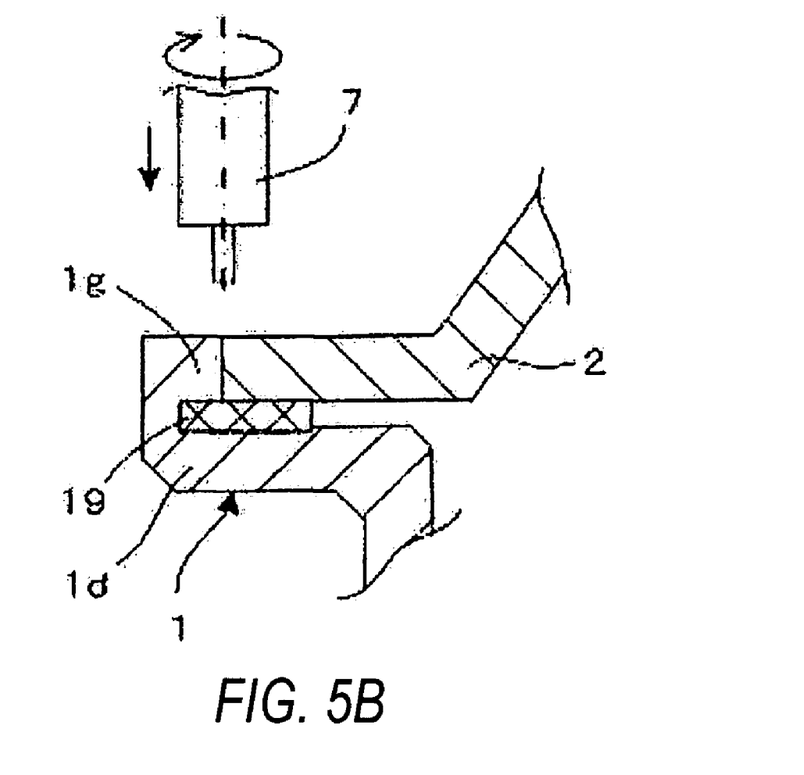
FIG. 5B is a partial sectional view illustrating a method of bonding a torque converter case in accordance with the fourth embodiment of the present disclosure.

FIGS. 5A and 5B are partial sectional views illustrating a bonding structure for the torque converter case in accordance with a fourth embodiment of the present disclosure. Specifically, FIG. 5A is a partial sectional view illustrating a method of forming the impeller shell 1 in the bonding structure, whereas FIG. 5B is a partial sectional view illustrating a method of bonding.

In the fourth embodiment shown in FIGS. 5A and 5B, the backing member 19 (as a separate member) is fixed to the impeller shell 1 by a plastic forming operation. Further, in this embodiment, the shape of the flange portion 1d of the impeller shell 1 is configured such that the backing member 19 (which in the embodiment shown, has a generally annular shape) may be installed from the axial direction. The flange portion 1d is deformed to cover the backing member 19 by the plastic working of forging so that the backing member 19 is fixed and an abutting portion 1g is formed. In the present embodiment, it is not necessary to divide the backing member 19, unlike the first embodiment.

Similarly, in the third and fourth embodiments, it is also not necessary to divide the backing members 18 and 19 as in the first embodiment. Further, it is not necessary to provide any construction for regulating the movement of the backing member.

Fifth Embodiment

FIGS. 6A to 6D are partial sectional views illustrating a method of assembling a torque converter in accordance with a fifth embodiment of the present disclosure. In the first and second embodiments, the convex portions 2c and 2d are formed in the converter cover 2 so as to perform the positioning of the backing member 12. However, in the fifth embodiment, a component of the lock-up clutch 5 is used to performing the positioning of the backing member 12.

In the fifth embodiment of the present disclosure, the converter cover 2 of the torque converter has a flanged hat shape. Further, a hat-shaped sliding contact member 14 is installed along an inner side surface of the converter cover 2. One end 14c of a flange portion 14a, which is an outer portion in the diametric direction of the sliding contact member 14, faces an inner side surface of the backing member 12 in the diametric direction and regulates the position of the backing member 12. In other words, the end 14c of the flange portion 14a prevents the backing member 12 from escaping the groove 11. A bottom portion 14b of the sliding contact member 14 contacts a bottom portion 2x of the converter cover 2. A frictional material 16 of a lock-up piston 15 constructing the lock-up clutch 5 slidingly contacts an opposite surface 14e of the bottom surface 14d, which contacts the bottom portion 2x of the converter cover 2 at a top surface 2y thereof (see FIG. 6D).

Figure 6A:
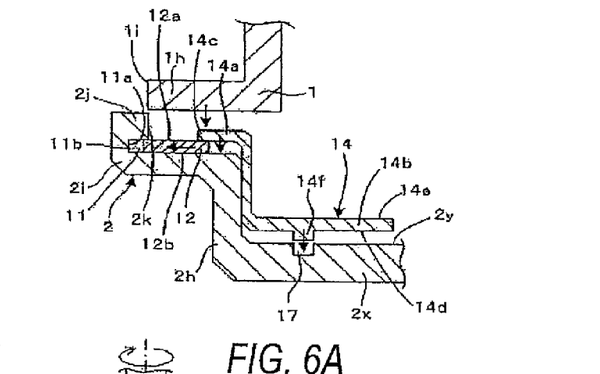
FIGS. 6A to 6D are partial sectional views illustrating a method of assembling a torque converter in accordance with a fifth embodiment of the present disclosure.

In an alternative embodiment, the flange portion 14a may be dimensioned so as to extend into the groove 11 such that the end 14c of the flange portion 14c of the sliding contact member 14 serves as the backing member.

As shown in FIG. 6A, a flange portion 2i, which protrudes outward in the diametric direction from an outer periphery 2h, is formed in the converter cover 2. In the flange portion 2i, an annular abutting portion 2j, which is abutted to the impeller shell 1 during the friction stir welding operation, is formed. Further, a surface at an inner peripheral side of the abutting portion 2j is a generally cylindrical abutting surface 2k coaxial with the rotational axis of the torque converter. Also, a generally outer peripheral end in a diametric direction of the impeller shell 1 is a flange-like abutting portion 1h abutted to the abutting portion 2j of the converter cover 2 when the friction stir welding operation is performed. An outer surface in a diametric direction of the abutting portion 1h is a generally cylindrical abutting surface 1i formed coaxially with an axis of the torque converter 100. By fitting the impeller shell 1 into the abutting portion 2j of the converter cover 2, the abutting surfaces 2k and 1i are abutted with each other in a diametric direction of the torque converter 100.

The annular groove 11b is formed in the flange portion 2i of the converter cover 2, wherein an outer portion in a diametric direction of the backing member 12 is inserted into the groove 11b. The groove 11b and a space, which is connected to the groove 11b between the impeller shell 1 and the converter cover 2, comprise the spacing portion 11 for receiving and accommodating the backing member 12. The bottom surface 11a of the groove 11b is disposed at a more outer peripheral side than the abutting surfaces 2k and 1i in a diametric direction of the torque converter 100. The abutting surfaces 2k and 1i are placed on the backing member 12 when the impeller shell 1 is fitted into converter cover 2, and the backing member 12 is inserted into the groove 11b.

The backing member 12 is divided into three or more parts so as to be insertable into the annular spacing portion 11. The surface of the backing member 12 at the bonding portion 8 side (see FIG. 6C) is formed as the generally flat surface 12a. Further, the plastic flow of the materials for the impeller shell 1 and the converter cover 2 is obstructed by the generally flat surface 12a during the friction stir welding operation. A surface of the backing member 12 at an opposite side is configured to be a generally flat surface 12b. The generally flat surface 12b contacts and is supported by the converter cover 2.

A method of assembling the torque converter, which is described above, is explained below. First, the backing member 12 and the sliding contact member 14 are installed at the converter cover 2 in the order introduced. The impeller shell 1 is then fitted into the converter cover 2, as shown in FIG. 6A.

Figure 6B:
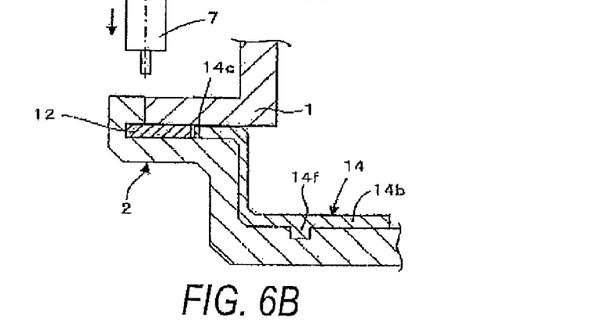
Figure 6C:
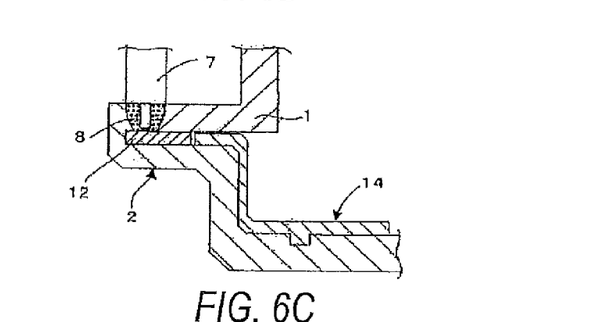
Figure 6D:
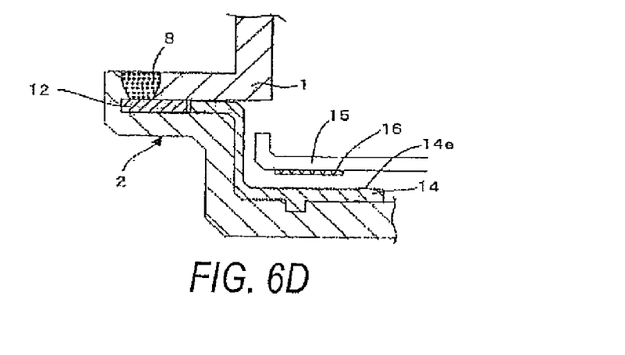

As shown in FIGS. 6B and 6C, the friction stir welding operation of the abutting surfaces 1i and 2k is thereafter performed. Then, as shown in FIG. 6D, the frictional material 16 of the lock-up piston 15 slidingly contacts the bottom portion 14b of the sliding contact 14.

Further, the peripheral rotation of the sliding contact member 14 between a bottom portion 2x of the converter cover 2 and a bottom portion 14b of the sliding contact member 14 is preferably regulated. It may also be desirable to provide an optional fitting portion for regulating an axial movement of the sliding contact member 14. The fitting portion may be formed such that a concave portion 17 is formed on the surface 2y contacted to the sliding contact member 14 of the bottom portion 2x of the converter cover 2. Also, a convex portion 14f that generally corresponds to the concave portion 17 is formed on the bottom surface 14d of the sliding contact member 14. The convex portion 14f is fitted into the concave portion 17.

Generally, when the frictional material 16 of the lock-up piston 15 slidingly contacts the converter cover 2, the material of the converter cover 2 must be an iron-based material, thereby increasing the weight of the converter cover 2. However, in the present embodiment, the iron-based sliding contact member 14, which comprises the sliding contact portion of the frictional material 16, is formed as a separate member. Thus, the material of the converter cover 2 may be a lighter material (i.e., aluminum-based material) to thereby reduce the entire weight of the assembly.

Sixth Embodiment

Figure 7:
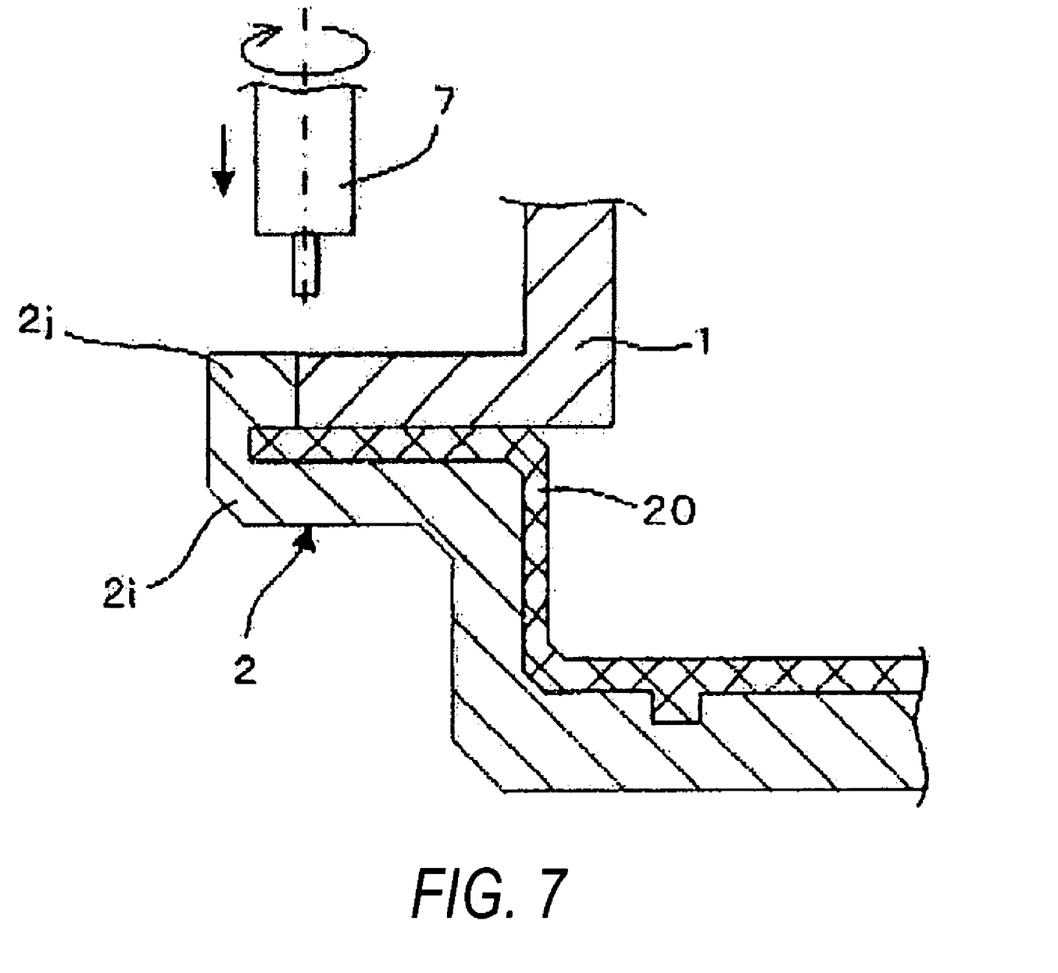
FIG. 7 is a partial sectional view illustrating a method of assembling a torque converter in accordance with a sixth embodiment of the present disclosure.

FIG. 7 shows the construction of a torque converter in accordance with a sixth embodiment of the present disclosure. In the sixth embodiment, the backing member 20 is integrally formed from an iron-based material to serve as a sliding contact member. The backing member 20 is integrally formed with the converter cover 2 via the cast-in operation when casting the converter cover 2 formed by an aluminum casting operation.

The impeller shell 1 is fitted into the converter cover 2 to which the backing member 20 is cast-in. Then, the impeller shell 1 and the converter cover 2 are bonded by the friction stir welding operation, similar to the previous embodiments.

While the preferred embodiments of the present disclosure are described above, the claimed invention may include other embodiments and modifications without deviating from the subject matter or scope of the present disclosure. For example, the present disclosure may be applied to a bonding structure for containers other than the torque converter case.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A bonding structure for a container including a container member having an opening and a covering member for covering the opening of the container member, the bonding structure comprising:
   a bonding portion of the container member and the covering member formed by inserting a friction stir welding tool into an abutting portion of the container member and the covering member and performing a friction stir welding operation; and
   a backing member that is disposed within a spacing portion that is defined between and enclosed by the bonding portion, the container member and the covering member, wherein the backing member includes a first surface and an opposing second surface, the first surface is disposed adjacent to the bonding portion, at a side of the abutting portion that is opposite to an inserting side of the friction stir welding tool to obstruct a plastic flow of materials of the container member and the covering member when the friction stir welding operation is performed, and the opposing second surface is in contact with a flange portion of one of the container member and the covering member in the spacing portion.

2. The bonding structure for the container of claim 1, wherein the backing member is substantially rectangular, such that the first surface and the second surface are generally flat, the spacing portion is shaped complementary to the backing member, and wherein the plastic flow of the materials is obstructed by the first surface of the backing member.

3. The bonding structure for the container of claim 2, wherein the bonding portion includes a first substantially planar wall surface of the container member and a second substantially planar wall surface of the cover member, wherein the first substantially planar wall surface and the second substantially planar wall surface are opposite to the inserting side of the friction stir welding tool, are substantially coplanar with respect to each other, and are both in engagement with the first surface of the backing member.

4. The bonding structure for the container of claim 1, wherein the container member further comprises a groove into which the backing member is inserted, the groove formed by a third substantially planar wall surface of the flange portion and a first substantially planar wall surface of the abutting portion that is parallel to and spaced from the third substantially planar wall surface, and wherein the covering member has a generally convex portion for preventing the backing member from escaping the groove, the generally convex portion spaced apart from the abutting portion and extending toward the flange portion.

5. The bonding structure for the container of claim 4, wherein the backing member is constructed of a material that has a softening temperature that is higher than a softening temperature of one or more materials from which the container member and the covering member are constructed.

6. A bonding structure for a torque converter case including an impeller shell having an opening and a converter cover for covering the opening of the impeller shell, the bonding structure comprising:
- a bonding portion of the impeller shell and the converter cover formed by inserting a friction stir welding tool into an abutting portion of the impeller shell and the converter cover and performing a first stir welding operation; and
- a backing member that is disposed within a spacing portion that is defined between and enclosed by the bonding portion, the impeller shell and the converter cover, wherein the backing member includes a first surface and an opposing second surface, the first surface is in contact with the bonding portion, at a side of the abutting portion that is at a side opposite to an inserting side of the friction stir welding tool to obstruct a plastic flow of materials of the container member and the covering member when the friction stir welding operation is performed, and the opposing second surface is in contact with a flange portion of one of the impeller shell and the converter cover in the spacing portion.

7. The bonding structure for the torque converter case of claim 6, wherein the first surface is a generally flat surface, and wherein the plastic flow of the materials is obstructed by the generally flat surface.

8. The bonding structure for the torque converter case of claim 7, wherein the second surface of the backing member is supported by the impeller shell.

9. The bonding structure for the torque converter case of claim 7, wherein the impeller shell has a groove into which the backing member is inserted, the groove formed by the flange portion and the abutting portion, and wherein the converter cover has a generally convex portion for preventing the backing member from escaping the groove, the generally convex portion spaced apart from the abutting portion and extending toward the flange portion.

10. The bonding structure for the torque converter case of claim 9, wherein the backing member has a generally annular shape along the bonding portion and an outer portion in a diametric direction of the generally annular shape is inserted into the groove of the impeller shell, wherein the convex portion of the converter cover has a generally annular shape adjacent and inboard of the backing member, and wherein the impeller shell has a generally concave portion into which the convex portion is fitted such that an outer portion in a diametric direction of the generally annular shape faces the convex portion of the converter cover.

11. The bonding structure for the torque converter case of claim 9, wherein the torque converter case receives a lock-up clutch and a sliding contact member is mounted on the impeller shell, wherein a frictional material mounted to the lock-up clutch slidingly contacts the sliding contact member, and wherein an outer portion in a diametric direction of the sliding contact member prevents the backing member from escaping the groove.

12. The bonding structure for the torque converter case of claim 11, wherein the sliding contact member further comprises at least one generally convex portion and the converter cover comprises at least one generally concave portion, wherein the convex portion is fitted into the convex portion to secure the sliding contact member to the converter cover.

13. The bonding structure for the torque converter case of claim 8, wherein the torque converter case receives a lock-up clutch and a sliding contact member is mounted on the impeller shell, wherein a frictional material mounted to the lock-up clutch slidingly contacts the sliding contact member, and wherein an outer portion of the sliding contact member in a diametric direction of the sliding contact member serves as the backing member.

14. The bonding structure for the torque converter case of claim 8, wherein the impeller shell is formed by a casting operation, and wherein the backing member is integrally formed by a cast-in operation with the impeller shell.

15. The bonding structure for the torque converter case of claim 8, wherein a bonding portion of the impeller shell and the converter cover is molded by forging, and wherein the backing member is fixed to the impeller shell at the time of the forging.

16. The bonding structure of the torque converter case of claim 8, wherein the backing member is constructed of a material that has a softening temperature that is higher than a softening temperature of one or more materials from which the impeller shell and the converter cover are constructed.

17. A method of bonding a container including a container member having an opening and a covering member for covering the opening of the container member, the method comprising:
- abutting a portion of the container member and the covering member with each other to define an abutted portion and a spacing portion that is defined between the container member and the covering member;
- installing a backing member within the spacing portion that is defined between the container member and the covering member, the backing member having a first surface and a second surface opposite the first surface, wherein a first surface of the backing member is disposed adjacent to the abutted portion at a side opposite of the abutted portion to an inserting side of a friction stir welding tool, and the second surface of the backing member is disposed adjacent to a flange portion of one of the container member and the covering member; and
- inserting the tool into the abutting portion of the container member and the covering member while rotating the tool and performing a friction stir welding operation to form a bonded portion, the backing member obstructing a plastic flow of materials of the container member and the covering member when the friction stir welding operation is performed wherein the backing member is enclosed within the spacing portion defined by the bonding portion, the container member and the covering member.

18. The method according to claim 17, wherein the flange portion is formed in the container, an end of the flange portion comprising the portion of the container member defining the abutted portion with the portion of the covering member.

19. The method according to claim 18, wherein installing the backing member comprises fixing the second surface of the backing member to the flange portion by a plastic forming operation; and wherein abutting the portion of the container member and the covering member with each other comprises:
- deforming the edge of the flange portion to cover an outer peripheral edge of the backing member and a portion of the first surface of the backing member; and
- placing the cover member to cover the opening of the covering member such that an outer peripheral edge of the covering member abuts the edge of the flange portion to define the abutted portion.

20. The method according to claim 17, wherein installing the backing member comprises integrally forming the backing member into the flange in a cast-in operation, the backing member comprising a different material from the one of the container member and the covering member including the flange.

21. The method according to claim 17, wherein the container member comprises an impeller shell and the covering member is a converter cover, the impeller shell and the converter cover forming a portion of a torque converter case, the method further comprising:

mounting the sliding contact member on an internal surface of the impeller shell, wherein an outer peripheral edge of the sliding contact member is sandwiched between the impeller shell and the converter cover facing the backing member.

\* \* \* \* \*